Patented Mar. 4, 1930

1,749,014

UNITED STATES PATENT OFFICE

LUDWIG ZEH, OF WIESDORF-ON-THE-RHINE, GERMANY, ASSIGNOR TO GENERAL ANILINE WORKS, INC., OF NEW YORK, N. Y., A CORPORATION OF DELAWARE

MANUFACTURE OF BINAPHTHYLENEDIOXIDE-QUINONE

No Drawing. Application filed October 4, 1928, Serial No. 310,443, and in Germany October 13, 1927.

The present invention relates to a process of oxidizing binaphthylene dioxide and to a new product obtainable thereby.

In accordance with the invention finely divided binaphthylene dioxide suspended in water is caused to be reacted upon by chromic acid. The chromic acid is suitably applied in excess (calculated upon the introduction of two oxygen atoms into the binaphthylene dioxide) and the temperatures to be used vary between about 20–50° C. When working in this manner a binaphthylene dioxide quinone of the probable formula

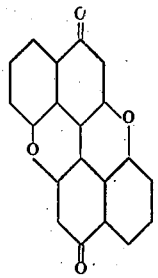

is obtainable differing from other binaphthylene dioxide quinones heretofore known especially by its nearly insolubility in the usual organic solvents.

The following example illustrates my invention without limiting it thereto, the parts being by weight:

*Example.*—15 parts of fine divided binaphthylene dioxide are suspended in 400 parts of sulfuric acid of about 25% strength. To this mixture a concentrated aqueous solution of about 30 parts of chromic acid is allowed to drop in, while maintaining the temperature at about 40–50° C. As soon as all of the binaphthylene dioxide has disappeared the reaction mass is cooled and filtered. The residue is washed with water until neutral, dried and extracted with boiling pyridine until all impurities are removed. The remaining binaphthylene dioxide quinone forms a reddish brown powder nearly insoluble in pyridine and the usual organic solvents. From large quantities of boiling aniline it can be obtained in a small amount in form of brown needles which dissolve in concentrated sulfuric acid with a reddish blue coloration and strong reddish violet fluorescence. When treating it with sodium hydrosulfite in alkaline solution a yellow vat is obtained, from which the sodium salt of the leuco binaphthylene dioxide can be obtained in form of yellow six edged leaflets, and from which vat cotton is dyed clear brown shades of good fastness properties.

I claim:—

1. Process which comprises reacting upon finely divided binaphthylene dioxide suspended in water with chromic acid at a temperature between about 20–50° C.

2. Process which comprises reacting upon finely divided binaphthylene dioxide suspended in water with an excess of chromic acid, and with the addition of sulfuric acid at a temperature between about 20–50° C.

3. Process which comprises reacting upon 15 parts of finely divided binaphthylene dioxide suspended in sulfuric acid of about 25% strength with a concentrated aqueous solution of 30 parts of chromic acid at a temperature of about 40–50° C.

4. The compound of the probable formula

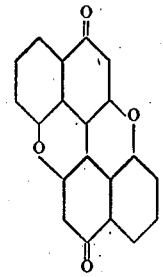

said compound forming a reddish brown powder nearly insoluble in the usual organic solvents, obtainable from large quantities of boiling aniline in form of yellow needles, dissolving in concentrated sulfuric acid with a reddish-blue coloration and with strong reddish-violet fluorescence, dyeing cotton from a hydrosulfite vat clear brown shades of good fastness properties.

In testimony whereof I have hereunto set my hand.

LUDWIG ZEH. [L. S.]

CERTIFICATE OF CORRECTION.

Patent No. 1,749,014.                                                 Granted March 4, 1930, to

LUDWIG ZEH.

It is hereby certified that error appears in the printed specification of the above numbered patent requiring correction as follows: Page 1, line 7, after the word "acid" and before the period insert the words "preferably with the addition of sulfuric acid"; and that the said Letters Patent should be read with this correction therein that the same may conform to the record of the case in the Patent Office.

Signed and sealed this 8th day of April, A. D. 1930.

(Seal)                                                                M. J. Moore,
                                                                                  Acting Commissioner of Patents.